United States Patent
Mächtle

[11] 3,974,734
[45] Aug. 17, 1976

[54] EXPANDABLE ANCHOR STUD

[76] Inventor: Fritz Mächtle, Jahnstrasse 4, 7015 Korntal, Germany

[22] Filed: June 14, 1974

[21] Appl. No.: 479,500

[52] U.S. Cl. .................................. 85/67; 85/87
[51] Int. Cl.² ................................. F16B 13/06
[58] Field of Search ............ 85/67, 86, 87, 88, 73, 85/74, 75, 76, 64

[56] References Cited
UNITED STATES PATENTS

| 601,553 | 3/1898 | Christensen | 85/86 |
| 896,756 | 8/1908 | Pleister | 85/76 |
| 981,382 | 1/1911 | Clements | 85/67 |
| 1,120,367 | 12/1914 | Booraem et al. | 85/69 |
| 1,361,836 | 12/1920 | Devlin | 85/76 |
| 1,639,231 | 8/1927 | Ogden | 85/67 |
| 1,648,420 | 11/1927 | Ogden et al. | 85/75 |
| 3,065,659 | 11/1962 | Eriksson et al. | 85/67 |
| 3,373,648 | 3/1968 | Pitzer | 85/67 |
| 3,837,257 | 9/1974 | Fischer | 85/67 |

FOREIGN PATENTS OR APPLICATIONS

| 259,211 | 4/1967 | Austria | 85/88 |
| 729,394 | 3/1966 | Canada | 85/33 |
| 897,568 | 5/1944 | France | 85/67 |
| 1,143,772 | 2/1963 | Germany | 85/87 |
| 48,678 | 11/1930 | Norway | 85/74 |
| 1,091,657 | 11/1967 | United Kingdom | 85/67 |
| 1,008,782 | 11/1965 | United Kingdom | 85/67 |
| 1,020,368 | 2/1966 | United Kingdom | 85/76 |

*Primary Examiner*—Ramon S. Britts
*Attorney, Agent, or Firm*—Bacon & Thomas

[57] ABSTRACT

An expandable anchor stud in which a threaded bolt or threaded rod carries two axially spaced, oppositely tapered expansion plugs which, when axially advanced against each other, cause the segments of a split stud shell positioned between the expansion plugs to expand radially, the two or three separate segments of the shell being radially retained against each other by a spring collar received inside a peripheral groove. In a novel production method, the shell segments are obtained from strip stock.

16 Claims, 5 Drawing Figures

U.S. Patent  Aug. 17, 1976  3,974,734
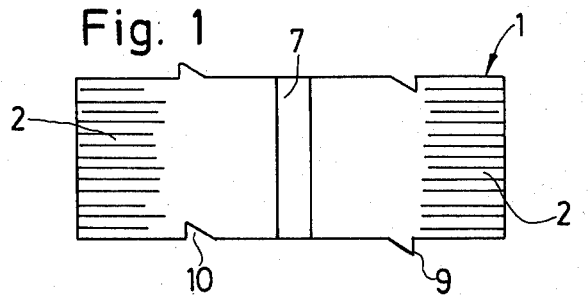
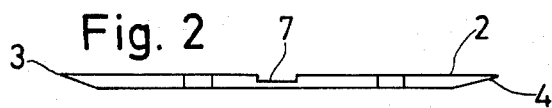
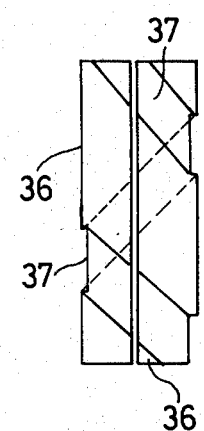
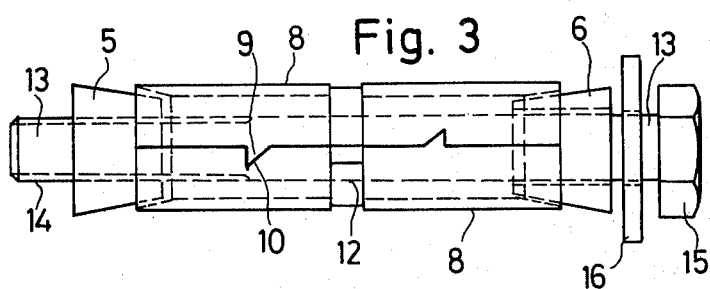
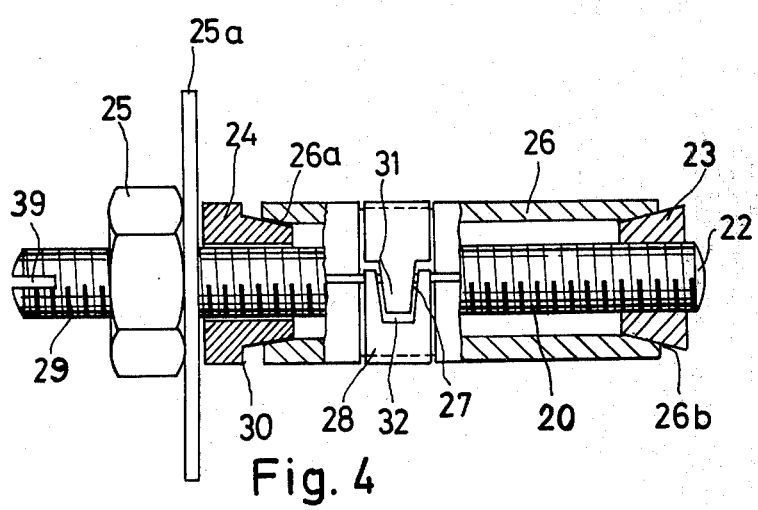

EXPANDABLE ANCHOR STUD

BACKGROUND OF THE INVENTION

1. Field of the Invention

The present invention relates to stud fasteners, and in particular to expandable anchor studs in which a threaded bolt or threaded rod carries spaced oppositely tapered expansion plugs which, when axially forced against each other, cause the two or more shell segments confined between the expansion plugs to expand radially, thereby providing an anchoring engagement inside a suitable anchoring bore.

2. Description of the Prior Art

From the prior art teachings in this field are known various types of expandable anchor studs, including anchor studs designed for heavy-duty applications, where it is necessary that the segments of the stud shell expand on both axial ends. One such prior art solution, disclosed in the German Printed Application (Offenlegungsschrift) No. 2,046,341, suggests an expanding anchor stud in which the longitudinally split segments of the stud shell are metal shell segments which abut against each other on their longitudinal edges. They are radially held together by means of plastic end rings fitted onto reduced-diameter end portions of the shell segments. This design is primarily intended to facilitate the the insertion of the anchor stud into its bore, while also being aimed at a simplification of its manufacture. However, one shortcoming of this prior art solution relates to the fact that the grooves, or the reduced-diameter end portions of the shell segments, on which the plastic rings are received are arranged in the same longitudinal portions of the segments which are also weakened from the inside by the provision of end tapers with which they cooperate with the expansion plugs on the threaded bolt. This means that the wall thickness of the shell segments is weakened from both sides. In order to minimize the depth of the outer diameter weakening, the plastic rings are therefore kept rather thin. This fact now entails a second shortcoming, namely the premature expansion of the anchor stud, when the threaded bolt is pre-tightened by hand, even if only slightly, prior to insertion, because in most cases the corresponding anchoring bore in the concrete wall or foundation is only some tenths of a millimeter larger than the non-expanded anchor stud. Thus, the overly easy premature expansion of the anchor stud may prevent its full insertion into the anchoring bore.

It was therefore found to be preferable that the shell segments are first expanded on their penetrating end portion. For this purpose, one would first slightly tighten the expansion plug on the penetrating side of the stud, which consequently would sit somewhat deeper inside the shell taper than the opposite expansion plug located near the mouth of the anchoring bore. It can now happen, however, that, during insertion of the anchor stud, the shell segments are axially shifted in relation to the threaded bolt, due to frictional engagement between the slightly expanded shell end and the wall of the anchoring bore, so that the shell segments ride up on the rear expansion plug, with the resulting risk that the anchor stud can not be fully inserted into the bore, because the shifted shell segments present a taper which is increasing in diameter toward the rear of the anchor stud.

SUMMARY OF THE INVENTION

It is a primary objective of the present invention to provide an improved expandable anchor stud with evenly expanding shell segments of generally cylindrical outline, whose separate components are simple in shape and therefore economical to manufacture and which are also particularly suited for a surface treatment giving them high resistance against corrosive influences. Another objective of the invention is the achievement of a simplified method of mass producing the anchor studs of the invention, with the aim of further reducing manufacturing costs, especially when large quantities are involved.

The invention proposes to attain the above objective by suggesting an expandable anchor stud having a shell composed of two or more shell segments which are radially held together by means of a spring collar received inside a shallow peripheral groove of the shell, the spring collar being a leaf spring bent into the shape of an annulus, and the receiving groove being located at a distance from the rear end (which engages the mouth of the anchoring bore) of the anchor stud which is equal to between one-third and one-fourth of the length of the shell. All component parts of the anchor stud are preferably surface treated for improved corrosion resistance, through hot-galvanizing, for example.

The suggested improvements make it impossible for the slightly pre-expanded shell segments to shift rearwardly during insertion into the anchoring bore, eliminating the resulting undesirable expansion of the rear portion of the stud and the consequent jamming of the latter at the mouth of the bore. The annular spring collar received inside the suggested shallow, relatively wide peripheral groove of the shell segments furthermore assures that the segments remain concentrically assembled during their handling, viz. shipping, storage and unpacking, prior to actual use and final insertion. Furthermore, since the spring collar engages opposing flanks of the groove with a comparitively small amount of axial clearance, the several shell segments are also longitudinally secured against shifting relative to each other. The off-center location of the peripheral groove closer to the rear end of the anchor stud also prevents the earlier-mentioned premature expansion of the shell segments at this end when, during insertion of the stud into a closely fitting bore, friction between the shell segments and the bore wall would produce axial forces on the shell segments tending to shift them off the front expansion plug and onto the rear expansion plug.

It was found that in most cases it is sufficient to provide a single peripheral groove having an axial width of at least 5 mm. However, it should be understood that the invention is not limited to the use of only one peripheral groove and one spring collar. The spring collar is preferably so received within the groove that it does not protrude over the peripheral outline of the shell of the anchor stud. The leaf spring serving as the suggested spring collar is heat-treated, and the other constituent parts of the heavy-duty ancho. stud of the invention are galvanized. Assembly of the expanding anchor stud requires only a simple operation in which the spring collar is first inserted over a mandrell from which it is then axially shifted over the assembled shell segments which may be held together inside a sleeve, or by some other simple device.

The invention further suggests that the end portions of the spring collar be not cut square, but that they be provided with matching tongue and groove outlines, i.e., with one end forming a protruding central tongue and the other end having a matching central recess. This feature assures that, even in the situation where the shell segments are expanded from their original position, an overlap exists between the tongue and groove formations on the spring collar, thereby preventing any radial misalignment between the separate shell segments.

A still further advantageous suggestion of the present invention relates to abutment means provided at the rear end portion of the anchor stud, which means limit the depth of axial advancement of the rear expansion plug into the shell segments, in order to prevent one-sided expansion of the anchor stud in a taper which might disengage itself from the anchoring bore. These abutment means may consist of a simple washer positioned behind the rear expansion plug and/or of spacer sleeves arranged between the expansion plug and the head of the threaded bolt or a nut which is screwed against the expansion plug on a threaded rod. In all cases a radial abutment shoulder is formed which limits the axial advance of the shell segments over the rear expansion plug after a given axial displacement and radial expansion of the shell segments in the mouth portion of the anchoring bore. Any further tightening of the threaded member then causes further expansion of the shell segments at their penetrated front ends only.

The suggested novel method of producing the component parts for the expandable anchor stud is characterized in that the several shell segments—preferably two or three segments forming a shell—are produced from flat profiled stock which is shaped into shell segments by a cold-forming operation, the profiled stock being bevelled along both edges, in order to produce the desired inside taper on the shell segments, and the peripheral groove for the spring collar being likewise provided in the profiled stock in the form of a longitudinal groove profile.

In a first alternative of the method of producing the shell segments for the anchor stud of the invention, a strip of steel sheet is cut into blanks which are then subjected to a cold-forming operation in which their end portions are bevelled and a shallow groove is pressed into their opposite side, whereupon the blanks are bent into segment shape and longitudinally trimmed. Lastly, two half-shells, or three third-shells, respectively, are combined to a shell segment, by slipping a spring collar over them. For this type of production method it is preferable to use a production press and a progressive compound blanking and forming die, the successive operations being thereby performed largely automatically. This method permits the realization of substantial savings in comparison to the presently known complicated method of machining shell segments from tubular stock, or of producing them through a die casting operation. Apart from the above simplification of the productive steps themselves, additional savings are achieved through the use of inexpensive rolled strip material, as compared to the previously used tubular stock. Lastly, a still further advantage results from a simplification of the surface treatment of the separate shell segments in either a chemical process, or by galvanization.

In a second alternative of the method of the invention, the base stock used for producing the shell segments is strip material which is cold-rolled into a profile containing both the shallow groove for the spring collar and the marginal bevels for the tapered surfaces of the shell segments. This profiled strip stock is then again cut into blanks of a length which corresponds to the arc occupied by a finished shell segment, the blanks needing only to be bent into the arcuate shape of the segments.

A still further suggestion offered by the present invention relates to means for longitudinally securing adjacent shell segments against each other, independently of the engagement provided by the spring collar and the shallow peripheral groove inside which it is received. This longitudinal interlocking means consists of complementary pairs of lateral protrusions and cooperating notches in the edge portions of adjacent shell segments. These protrusions and notches are conveniently obtainable in conjunction with the earlier-mentioned manufacturing method of the present invention, whereby these protrusions and notches are either cold-formed into the cut blanks or, preferably, the blanking tool is provided with an appropriate tool shape which, instead of producing a straight cut, produces a notch and a protrusion on each transverse cut.

Still another suggestion of the invention relates to the radius of curvature of the shell segments in the case of two half-shells. In this case, it is suggested that the two half-shells have an outer radius of curvature corresponding to the expanded diameter of the shell segment, each half shell being less than a full 180° arc of the diameter so that the shell segments, when clamped against each other by the spring collar, have a somewhat oval cross-sectional outline, but, when expanded inside an anchoring bore, fit snugly with the latter over their entire circumference. Obviously, this is not so in the case where the shell segments form an exact cylindrical body in their relaxed position, in which they are clamped against each other by the spring collar.

Instead of providing a shallow peripheral groove for a spring collar, it is also possible to provide a helical groove in the periphery of the separate shell segments, the helical groove threading longitudinally across the assembled shell segments and receiving a helical spring having a matching flat profile. This version has certain advantages in connection with the assembly of semi-cylindrical shells, when mounting the spring member, especially in the case where the latter is comparatively heavy in cross section and correspondingly strong.

BRIEF DESCRIPTION OF THE DRAWING

Further special features and advantages will become apparent from the description following below, when taken together with the accompanying drawing which illustrates, by way of example, several embodiments of the invention, represented in the various figures as follows:

FIG. 1 shows in plan view a blank for a shell segment, prior to final bending, as part of an expandable anchor stud embodying the invention;

FIG. 2 shows the blank of FIG. 1 in an end view;

FIG. 3 shows an assembled expandable anchor stud, using shell segments obtainable from the blank illustrated in FIGS. 1 and 2;

FIG. 4 shows an alternative embodiment of the expandable anchor stud embodying the invention; and FIG. 5 shows a set of shell segments of still another embodiment of the invention.

DESCRIPTION OF THE PREFERRED EMBODIMENTS

Referring to FIGS. 1 and 2 of the drawing, it can be seen that the width of the cut strip material corresponds approximately to the length of the shell segments of the anchor stud. The bevelled edge portions 3 and 4 of the segment blank 1 are obtained in one or several cold-forming operations. These bevels later form inside tapers on the arcuate shell segments which cooperate with the tapered expansion plugs 5 and 6 (FIG. 3) of the anchor stud. The angle of the bevelled portions 3 and 4 to the plane of the blank 1 is relatively shallow e.g. in the order of 7°. In a simultaneous or subsequent cold-forming operation, the opposite side of the segment blank 1 is provided at both of its longitudinal end portions with a knurl or an otherwise roughened surface pattern 2 consisting of longitudinal grooves and/or transverse grooves, for example. Also simultaneously, or in a separate operation performed in a progressive die-forming sequence, the outer side of blank 1 is impressed with a shallow transverse groove 7 having a generally rectangular cross section.

For very large production quantities, the invention suggests, as an alternative method of producing the shell segments, the use of flat strip stock into which the profile of FIG. 2 is rolled by means of a cold-rolling press. This profile strip then needs only to be cut and bent to obtain finished shell segments.

The bending operation required is essentially the same for both production methods mentioned. While being bent, the bevelled edge portions 3 and 4 of blank 1 are preferably supported by appropriately tapered shoulder portions on the bending mandrell. At the time of final bending of the shell segments, or preferably at the time of transversely cutting the blanks 1 from the strip stock, their longitudinal edges may further be provided with lateral protrusions 9 and cooperating notches 10. These protrusions and notches serve the purpose of preventing any longitudinal shifting of a shell segment in relation to other segments. Of course, the particular triangular shape of the protrusions 9 and the notches 10 shown in FIG. 1 may be replaced by other suitable cooperating protrusions and recess formations. An essential characteristic of the proposed shell segment shape and production method is the fact that it is economically obtainable by means of blanking tools, rather than in an expensive and time-consuming machining operation.

Referring to FIG. 3, in which an assembled expandable anchor stud is illustrated, it can be seen that it includes two half-shells 8 which are held together by means of a spring collar 12, received in a shallow peripheral groove 7 in the shell segments 8. The latter are longitudinally secured against each other by means of lateral extensions 9 and cooperating lateral notches 10 in the adjacent edge of the other shell segment. Although in FIGS. 1–3 the axial position of the peripheral groove 7 and its spring collar 12 is shown to be located at mid-length of the shell segments 8, this location should be seen as in expedient possibility only. In fact, the present invention specifically suggests, as shown in FIG. 4, that the axial location of the groove and spring collar be located closer to the protruding, i.e., rear side of the anchor stud. The assembled shell segments 8 of FIG. 3 are received axially between opposing expansion plugs 5 and 6 which, in turn, are seated on a central threaded bolt 13, the latter engaging the expansion plug 5 with its thread, but not the rear expansion plug 6. Thus, while plug 5 is threaded, plug 6 has a simple central bore, being seated on the threaded bolt 13 either on a smooth diameter or on a threaded portion, without engaging the latter.

Between the rear expansion plug 6 and the head 15 of the threaded bolt is further arranged a washer 16. In the place of washer 16 may also be used one or several spacer sleeves. It should also be understood that the threaded bolt 13 may be replaced by a threaded rod carrying a cooperating nut, suggested in FIG. 4, for example. In this figure, which features a central threaded rod 20, engaging a threaded front expansion plug 23 and a rear clamping nut 25, the item which is to be fastened by the anchor stud may either be clamped between the rear washer 25a and the clamping 25, or the threaded rod 20 may have a rear extension 29 onto which may be screwed additional clamping nuts (not shown) for the attachment of an item, or items, to be anchored by means of the novel expanding stud.

As further shown in FIG. 4, the threaded rod 20 of this embodiment carries near its front extremity 22 a tapered expansion plug 23. This plug is threaded and preferably permanently attached to the rod 20 by means of an adhesive connection, or equivalent blocking means. However, the blocking of plug 23 on rod 20 is not absolutely necessary, although it facilitates the initial expansion engagement between plug 23 and the shell segments 26.

An oppositely tapered expansion plug 24 is engaging the rear extremity of the shell segments 26, having a throughbore for the accommodation of the threaded rod 20, plug 24 being advanceable toward plug 23 through rotation of a nut 25 engaging the threaded rod 20. To the extent to which it is necessary to retain the threaded rod 20 against rotation with the nut 25, if it is not held sufficiently by the frictional connection between the segments 26 and the forward plug 23, rod 29 can be held with a screwdriver engaging a slot 39. Between nut 25 and plug 24 is further arranged a washer 25a limiting the depth of engagement of the anchor stud in the anchoring bore. Together with washer 25a, or in its place, may also be used spacer sleeves, as the specific mounting configuration may require.

The expanding shell segments 26 of the anchor stud cooperate with the opposing expansion plugs 23 and 24 by means of suitable end tapers 26a and 26b, the several segments being held together by means of a spring collar 28 engaged inside a shallow peripheral groove 27 of the shell segments.

It is an important contribution of the present invention that it permits an optimal treatment of the shell segments 26 against corrosion, as by hot galvanization of the separate shell segments and other anchor stud components. This improved surface treatment ensures a highly corrosion-resistant assembly, usable in places where it is subjected to strong corrosive influences, including certain chemical substances, as in the case of anchors for the guide planks of highways, for example, where the use of salt for de-icing purposes adds to the normal corrosive influence of the weather.

The use of the proposed shell segments, in combination with opposing expansion plugs, to obtain parallel expansion of the segments, in contrast to a tapered, one-sided expansion, is further improved through their combination with the annular spring collar engaging the shell segments. The location of this spring collar closer to the rear end of the anchor stud also ensures that the shell segments will not accidentally shift toward the rear expansion plug, so as to become blocked in the mouth of an anchoring bore, before being fully inserted. The peripheral groove 27 is therefore preferably located at between one-quarter and one-third of the length of the shell segments 26 from their rear extremity, i.e., from the side engaging the mouth of the anchoring bore.

As mentioned earlier, the peripheral groove 27 is preferably shallow and comparatively wide, the width of the spring collar 28 being adapted to fit the groove 27 with only a small axial clearance, thereby also longitudinally securing the several shell segments against each other. As in the earlier-described embodiment, the width of groove 27 is again suggested to be at least 5 mm. In FIG. 4 is also shown a possibility of obtaining a circumferential overlap between the ends of the spring collar 28, even when expanded, by providing a tongue 31 on one extremity and a matching notch 32 on the opposite extremity of the collar. The tongue 31 and the notch 32 are preferably slightly tapered and centered with respect to the width of the spring collar 28. Alternatively, an overlap may also be obtained by cutting the two ends of collar 28 obliquely with respect to its lateral edges.

FIG. 5 shows another possibility of providing a coiled, resilient retaining means around the shell segments. Here, a shallow helical groove 37 is arranged on the periphery of the shell segments 36, the groove running from one axial end to the other, a matching helical spring (not shown) engaging the groove, thereby radially compressing the shell segments over their entire length. This version has the advantage of facilitating the mounting of the resilient retaining member, the helical spring being engageable axially, without the need for first expanding the shell segments, and then axially pushing the retainer spring over the assembled shell segments into the groove.

It has also been observed that double-plug anchor studs may nevertheless have a tendency to expand farther near their rear end, i.e., in the mouth of the anchoring bore, than near their forward end, on the deep end of the anchoring bore. This tendency can be balanced in a simple way, for example, by providing a radial shoulder 30 on the rear expansion plug 24, the shoulder 30 arresting the rearward expansion of the shell segments, when a predetermined diameter is reached, by abutting the rear end faces of the segments 26 against it. Any additional expansion is then limited to the forward expansion plug 23, which thereby creates a desirable high clamping force at the penetrated end portion of the anchor stud. A similar end result is obtainable by replacing the straight taper of the rear expansion plug 24 with a curved cam surface, so that the rear end tapers of the shell segments encounter a progressively steeper angle as they advance onto plug 24.

Lastly, it is of course also possible to use unequal taper angles on the front and rear ends of the expandable stud. A steeper rear taper angle, for example, has an effect which is very similar to that of the off-center-positioned spring collar 28 (FIG. 4), while at the same time producing the desirable higher clamping force at the penetrated end of the anchor stud.

It should be understood, of course, that the foregoing disclosure describes only preferred embodiments of the expandable anchor stud of the invention and that it is intended to cover all changes and modifications of these examples of the invention which fall within the scope of the appended claims.

I claim:

1. An anchor stud adapted for insertion into, and clamping attachment against a cylindrical bore, the anchor stud comprising:
   a central threaded member defining a longitudinal axis and a front and rear end of the stud said rear end having tool engaging means thereon, whereby said front end is adapted to be inserted into said cylindrical bore;
   a pair of oppositely tapered expansion plugs arranged on the threaded member in a concentric, axially spaced relationship near its front and rear ends, the respective tapers of said plugs converging toward each other, the rear expansion plug being axially slidable on said threaded member means for causing the front expansion plug to be displaced in a rearward direction;
   an expandable shell assembly comprised of a plurality of separate arcuate shell segments of equal length mounted about the stud with the front and rear expansion plugs at opposite ends thereof, whereby said shell segments cooperate with the tapers of said front and rear plugs, respectively;
   an external peripheral groove on said shell assembly, said groove having a broad and shallow rectangular cross-section;
   said groove being located axially closer to the rear end of said shell assembly than to the front end of said shell assembly;
   a coiled spring means positioned within said groove surrounding and radially retaining the segments of said expandable shell assembly; and
   means on said rear expansion plug for limiting axial displacement and radial expansion of said shell assembly at the rear expansion plug;
   whereby the off-center location of said groove prevents rearward shifting and premature expansion of said shell assembly during insertion,
   whereby said spring member assures maintaining a concentric arrangement of said shell segments during handling, and
   whereby non-uniform expansion and distribution of clamping force is achieved.

2. An anchor stud as defined in claim 1, wherein:
   the constituent parts of the expandable anchor stud are hot-galvanized.

3. An anchor stud as defined in claim 1 wherein said spring means is a leaf spring bent in the shape of an annulus.

4. An anchor stud as defined in claim 3 wherein said leaf spring has a broad and shallow rectangular cross section;
   said spring having a small axial clearance within said groove;
   whereby said shell segments are secured against logitudinally shifting with respect to one another.

5. An anchor stud as defined in claim 4 wherein said spring has overlapping ends in the form of a tongue and groove,
   whereby radial misalignment between the segments of said shell is prevented during expansion of said shell assembly.

6. An anchor stud as defined in claim 1 wherein:
   said rear expansion plug has a tapered, curved cam surface, so that the rear end tapers of the shell segments encounter a progressively steeper angle as they advance onto said rear plug.

7. An anchor as defined in claim 3, wherein: the distance between the peripheral groove and the rear expansion plug is between two and three times larger than the distance between said groove and the front expansion plug.

8. An anchor as defined in claim 4, wherein: the depth of the peripheral groove is such that the leaf spring does not radially protrude over the periphery of the shell assembly; and the width of the leaf spring is at least 5 millimeters.

9. An anchor stud as defined in claim 1, wherein: the angle of taper of the rear expansion plug is greater than that of the front expansion plug so that the expansion force created is greater on the front plug than on the rear plug.

10. An anchor as defined in claim 1, further including: means for longitudinally interlocking the several shell segments against each other so as to prevent longitudinal shifting of any segment relative to another segment.

11. An anchor as defined in claim 10, wherein: the function of said interlocking means is served by the spring member engaging the peripheral groove in the shell segments in an axially centering relationship.

12. An anchor as defined in claim 10, wherein: the longitudinal interlocking means includes cooperating protrusions and notches in the longitudinal edge portions of two adjacent shell segments.

13. An anchor as defined in claim 1, wherein: the shell segments have on their outer diameter, on at least their axial end portions, a roughened surface portion with knurl-type indentations.

14. An anchor as defined in claim 1, wherein: the shell assembly consists of two generally semi-cylindrical shell segments; the outer radius of curvature of the segments corresponds substantially to the larger radius of the anchoring bore; and the arc height of each segment is less than its radius, the angle defined by the arc being thus less than 180°, so that the non-expanded shell assembly has a non-circular cross-sectional outline.

15. An anchor as defined in claim 1, wherein said means for limiting axial displacement and rearward expansion comprises a portion of said rear plug whereby one-sided expansion of the anchor stud is prevented.

16. An anchor as defined in claim 15, wherein: the limiting means includes an enlarged-diameter axial shoulder on the rear expansion plug surrounding the larger end of the taper, against which the shell segments abut following a predetermined axial relative movement between the shell segments and the rear expansion plug.

* * * * *